INVENTOR.
Frank A. Martin &
Kenneth R. Warburton
BY Harry S. Dumass
ATTORNEY.

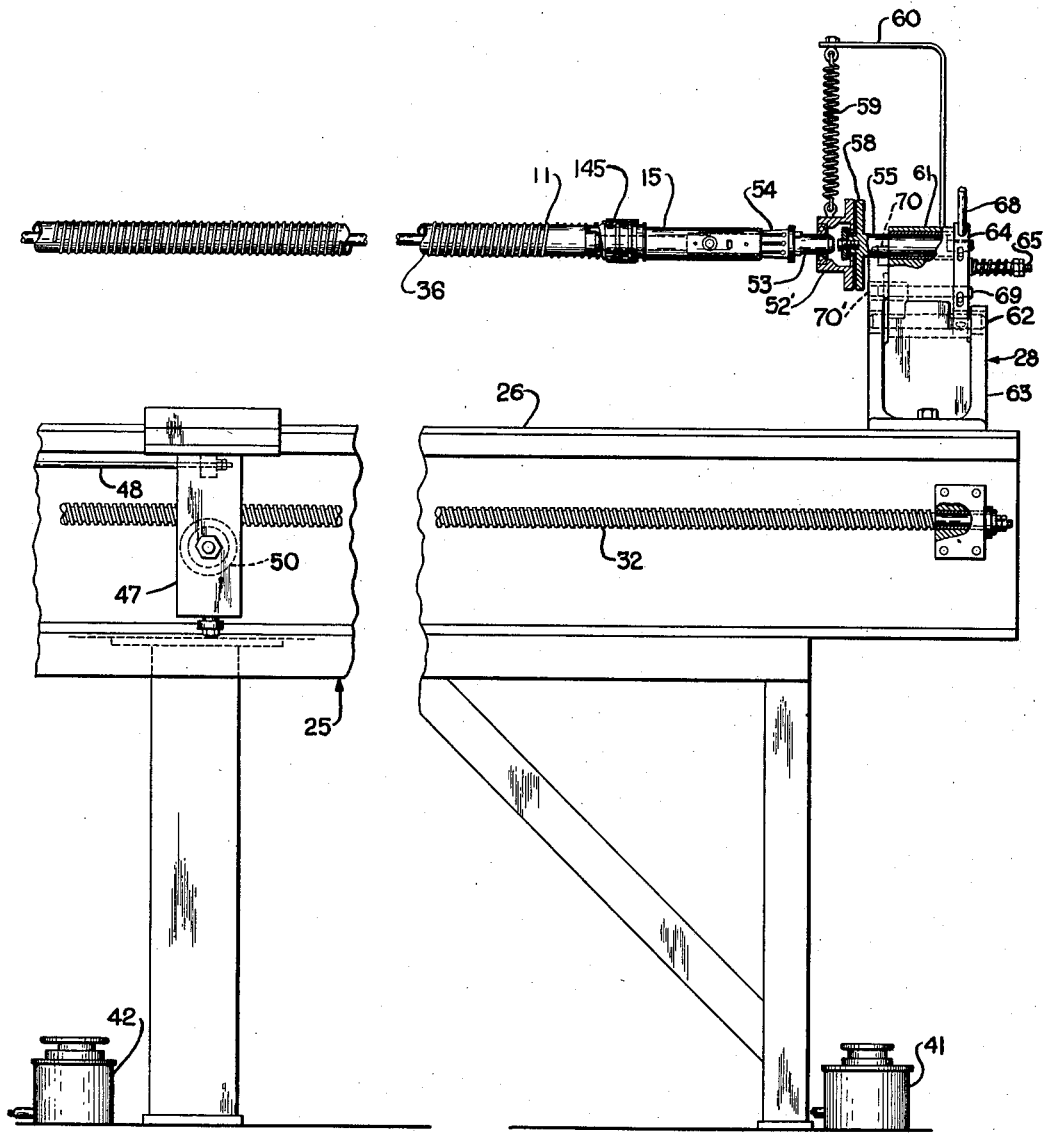

INVENTOR.
Frank A. Martin &
Kenneth R. Warburton
BY
Harry S. Bunner
ATTORNEY.

June 9, 1953　　　F. A. MARTIN ET AL　　　2,641,300
HOSE MAKING MACHINE
Filed May 19, 1950　　　　　　　　　　　　10 Sheets-Sheet 4
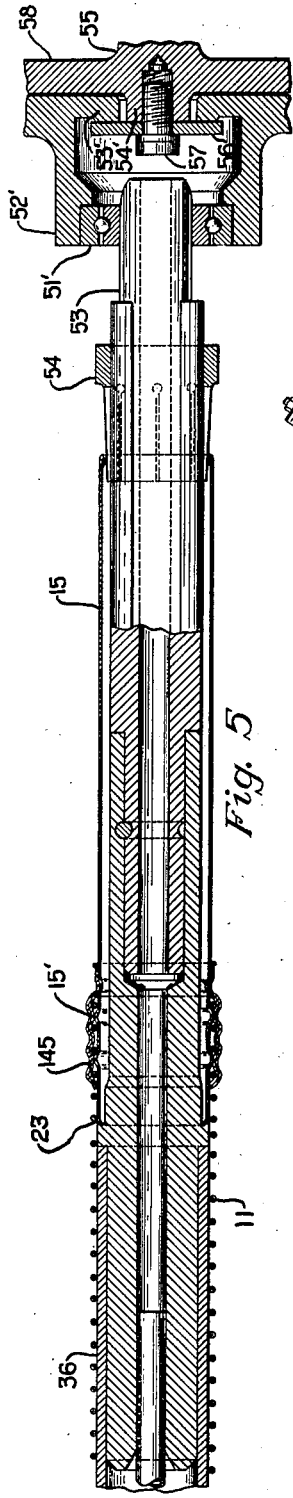
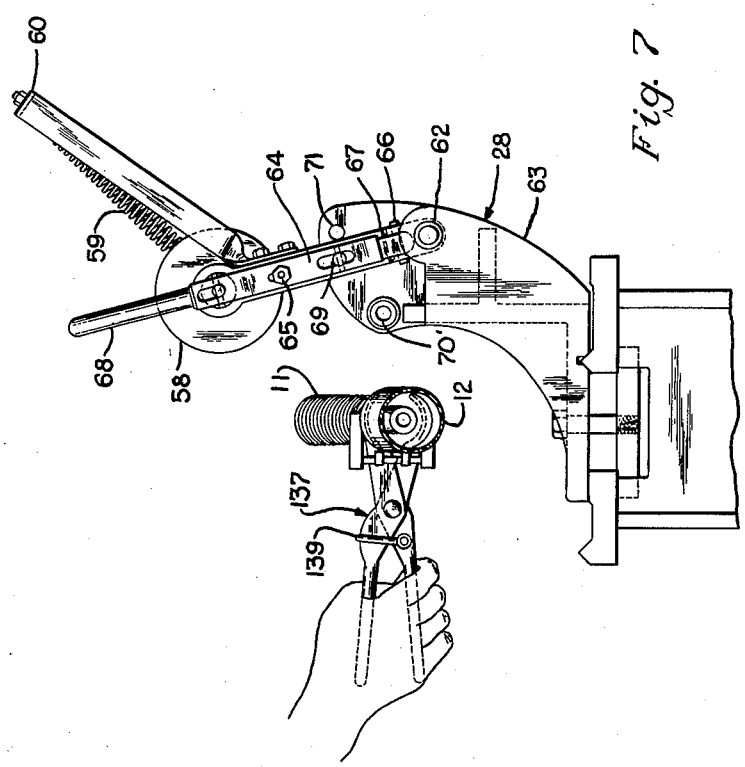
INVENTOR.
Frank A. Martin &
Kenneth R. Warburton
BY
Harry S. Demasse
ATTORNEY.

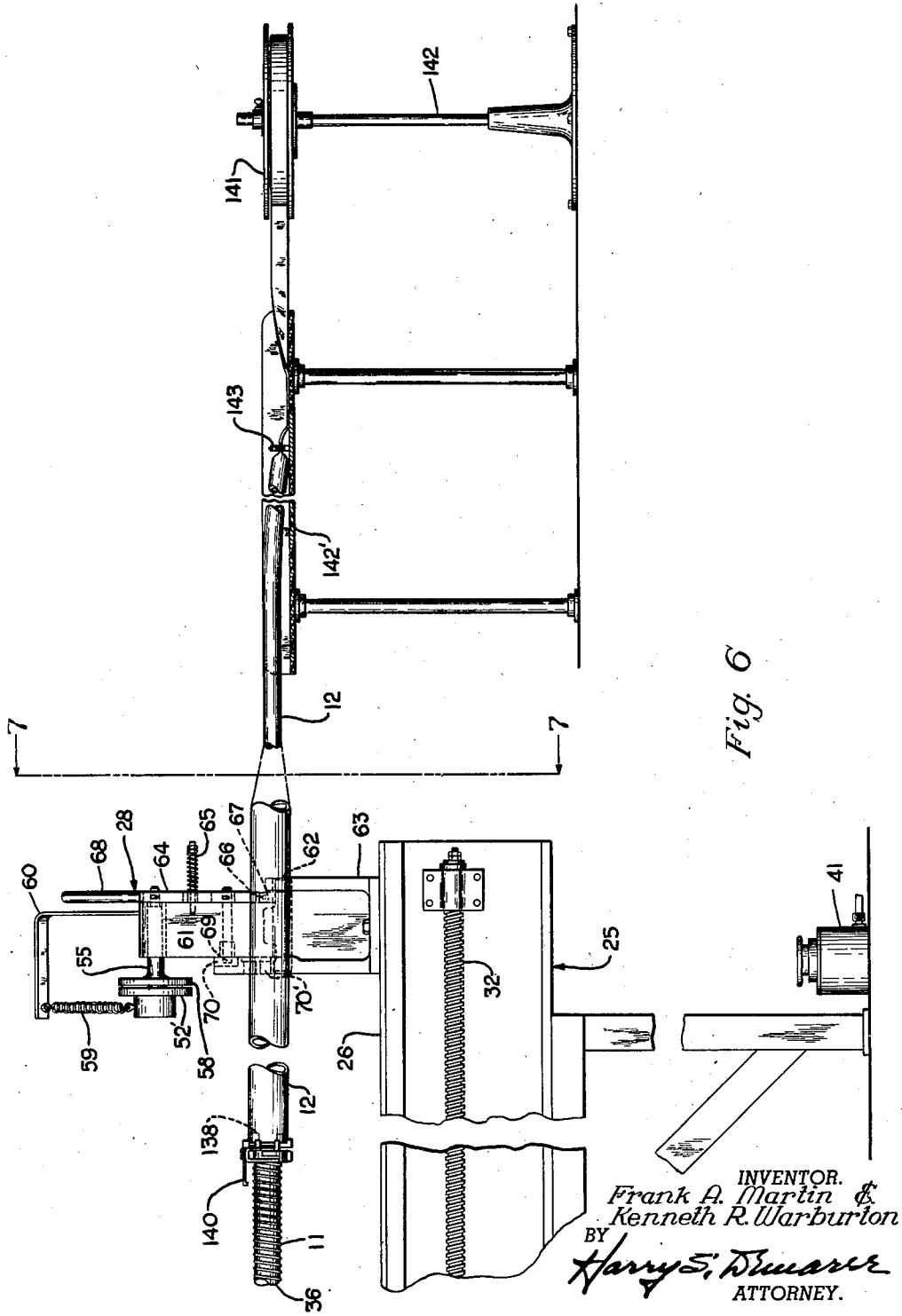

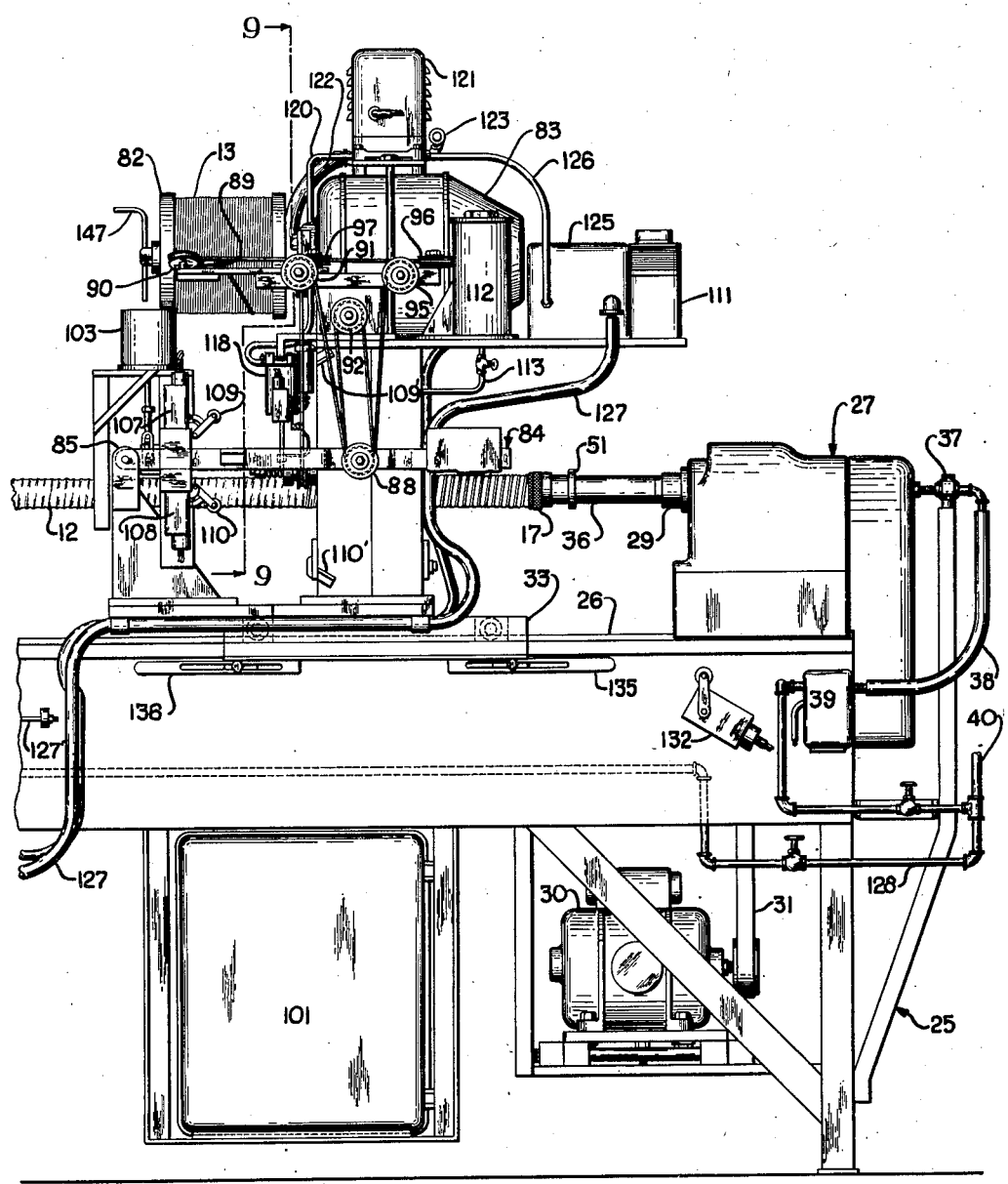
Fig. 8.b

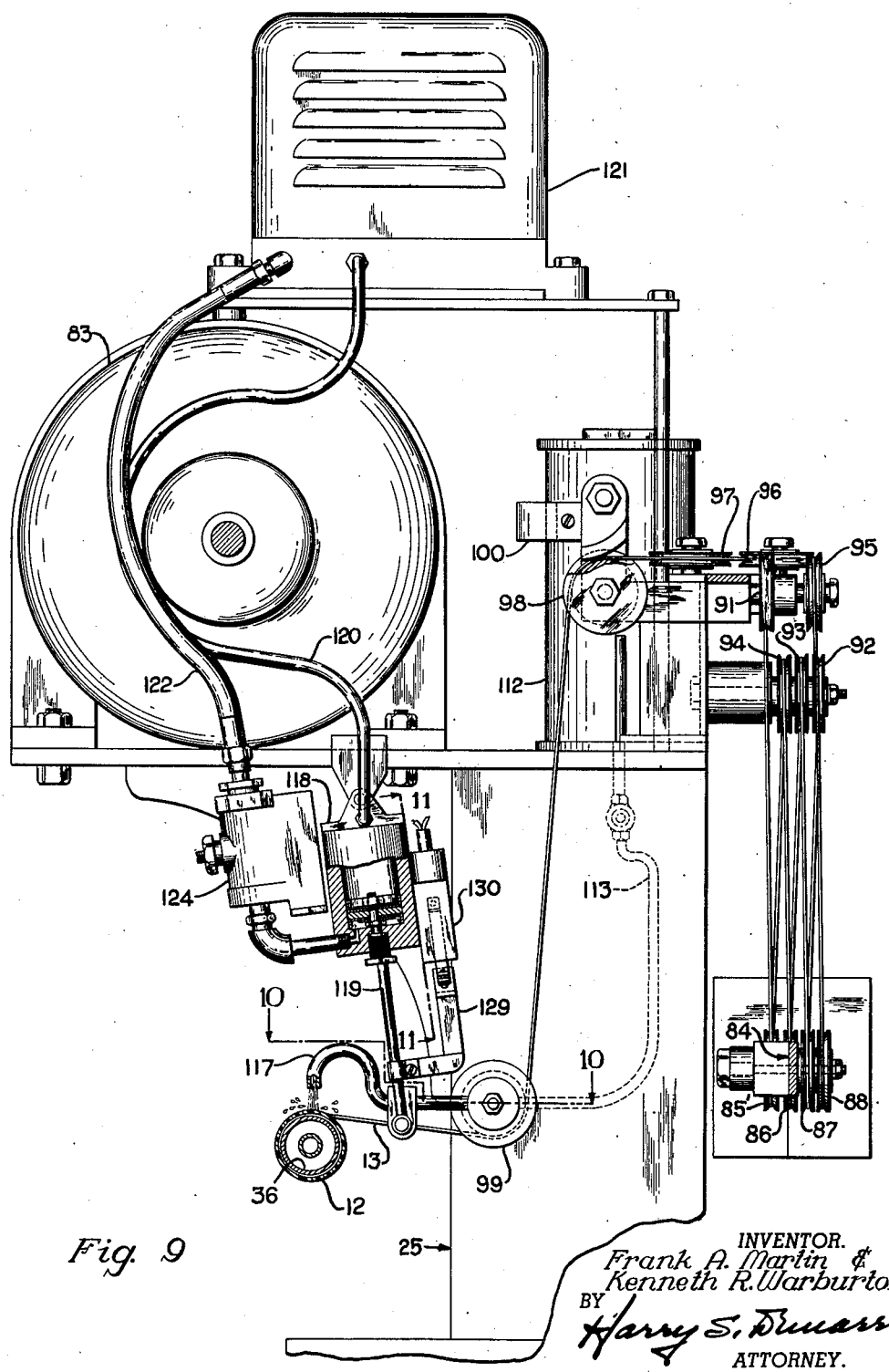

June 9, 1953　　　F. A. MARTIN ET AL　　　2,641,300
HOSE MAKING MACHINE

Filed May 19, 1950　　　　　　　　　　　　　10 Sheets-Sheet 9

INVENTOR.
Frank A. Martin &
Kenneth R. Warburton
BY
Harry S. Demerre
ATTORNEY.

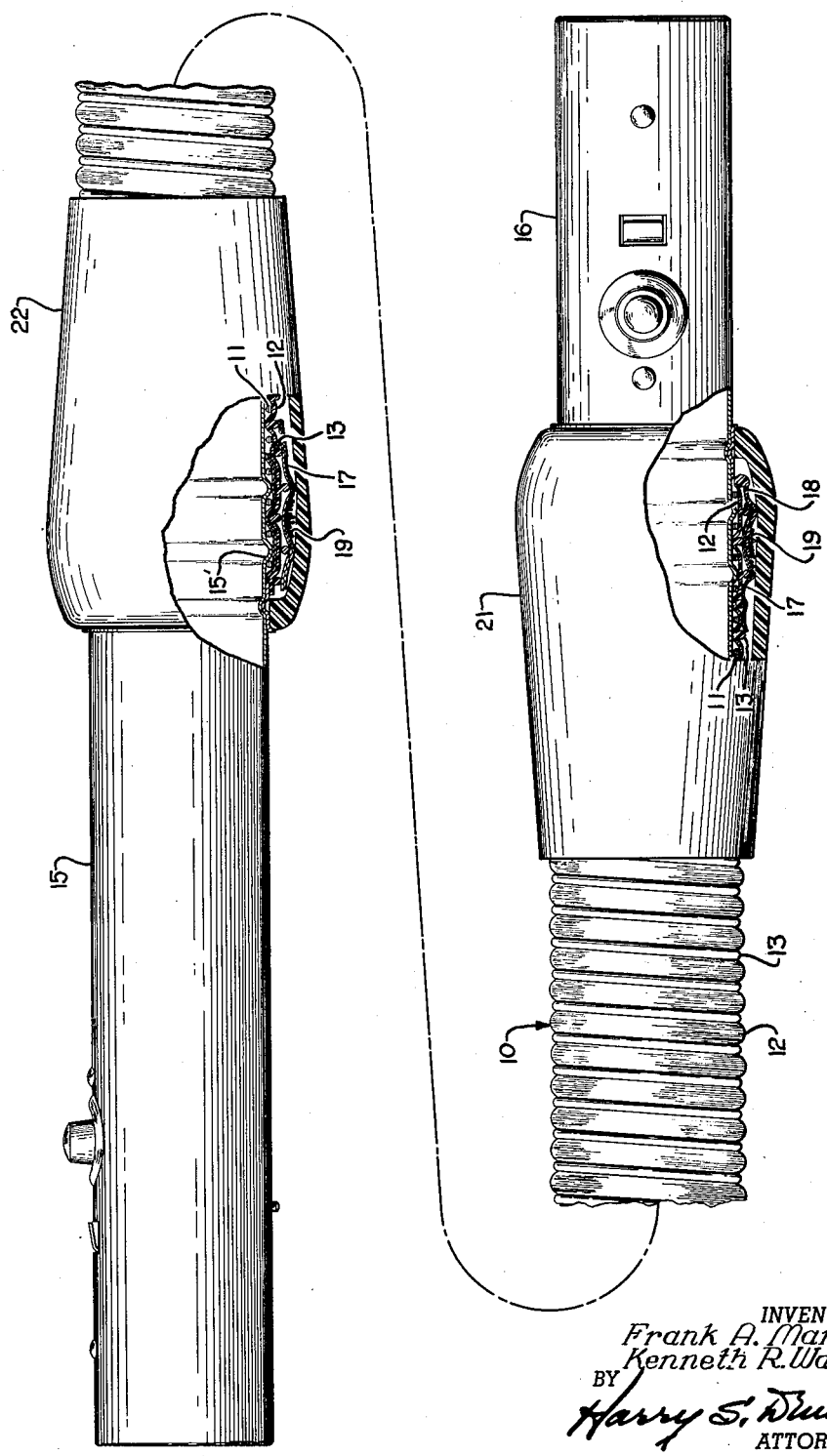

Patented June 9, 1953

2,641,300

UNITED STATES PATENT OFFICE 2,641,300

HOSE MAKING MACHINE

Frank A. Martin, Akron, and Kenneth R. Warburton, North Canton, Ohio, assignors to The Hoover Company, North Canton, Ohio, a corporation of Ohio Application May 19, 1950, Serial No. 162,882

18 Claims. (Cl. 154—7)

This invention relates to hose making machines and more particularly to a machine for making flexible and durable hose for use with suction cleaners.

The machine of this invention is specially adapted to make hose consisting of an inner helically wound reenforcing wire spring, an impervious elastomeric thermoplastic seamless tube overlying the wire with an elastomeric thermoplastic cord wound under constant tension over the tube midway between the wire convolutions so as to draw the walls of the tube inwardly between the wire convolutions with the cord bonded to the tube walls during the winding operation by the application of a solvent to the tube wall a few turns ahead of the point where the cord is being wound about the tube.

The machine disclosed but not claimed in an application for United States Letters Patent by John E. Vance, Serial No. 98,920, filed June 14, 1949, Patent No. 2,550,099, dated April 21, 1951, forms a part of the present invention, the machine disclosed in the present application being an improvement. The claims in this application readable upon the machine disclosed in the application above referred to are intended to cover that machine as well as the machine disclosed herein.

According to the broadest aspects of the present invention the machine is provided with a rotating mandrel driven by a reversible motor and geared to a traveling carriage carrying a spring spacing device, a support for a spool of cord, a cord tensioning device and a solvent dispenser whereby the pitch of the coil spring can be increased and the spring stressed circumferentially to cause it to tightly grip the mandrel by rotation of the mandrel in one direction while the carriage moves from one end of the bed to the other and the cord can be wound about the tube between the wire convolutions by rotation of the mandrel in the opposite direction as the carriage returns to the end of the machine from which it originally started. The solvent dispenser is so positioned as to apply a solvent to the tube wall a few turns ahead of the point where the cord is being wound about the tube. The tail stock is so made as to be pivoted out of the way so that the tube can be applied over the coiled spring between the above two steps and the tube carcass removed from the mandrel after the winding operation.

According to a more specific object of this invention, automatic controls are provided whereby the carriage is stopped at the end of the spring spacing operation simultaneously with the rotation of the mandrel and at the end of the cord winding operation simultaneously with the stopping of the reverse rotation of the mandrel.

According to another object of the present invention the mandrel is of hollow construction and connected to a source of air under pressure so that the tube can be more readily inflated and pulled over the spring which is tightly wound on the mandrel. Foot actuated switches are provided at each end of the machine for controlling an air flow valve whereby a single operator can control the flow of air to the tube and simultaneously draw the tube over the spring.

According to another object of the present invention an automatic cord tensioning device is provided in the form of an electric brake in which the braking effect is automatically varied with changes in cord tension. The brake is in the form of a D. C. generator under constant load deriving its exciting current from an electronic rectifier. The A. C. input circuit to the rectifier is in series with the coils of a reactance solenoid the plunger of which is connected to a dancer roll in the form of a weighted arm having pulleys about which the cord extends so that any variation in cord tension moves the plunger of the solenoid into or out of the coil to vary the input to the rectifier tube and thus vary the excitation of the brake to vary its braking effect. A manually actuatable rheostat is also in series with the A. C. circuit of the rectifier tubes to vary the input to the rectifier so as to manually adjust the initial braking effect of the electric brake.

According to another object of the present invention a solvent dispensing tube is provided and the flow therefrom controlled in synchronism with the control for the motor so that solvent is supplied to the tube simultaneously with the starting of the winding operation and stopped simultaneously with the stopping of the winding operation.

Other objects and advantages of this invention will become apparent as the description proceeds when taken in connection with the accompanying drawings in which:

Figure 1, shown on separate sheets and marked 1a and 1b, is a front elevation of the machine of this invention showing the parts in the position they occupy at the end of the wire spacing operation;

Figure 5 is a detail view of the rear end of the mandrel and tail stock showing the details of the tail stock construction and how the spring is secured to the mandrel at its tail end;

Figure 6 is a front elevation of the tail end of the machine showing how the tail stock is supported and also showing a supporting stand for the tube as it is being applied to the mandrel;

Figure 7 is a side view of the tail stock taken on line 7—7 of Fig. 6 looking in the direction of the arrows showing the tail stock moved out of the way and a tube spreading tool applied to the open end of the tube;

Figure 10:
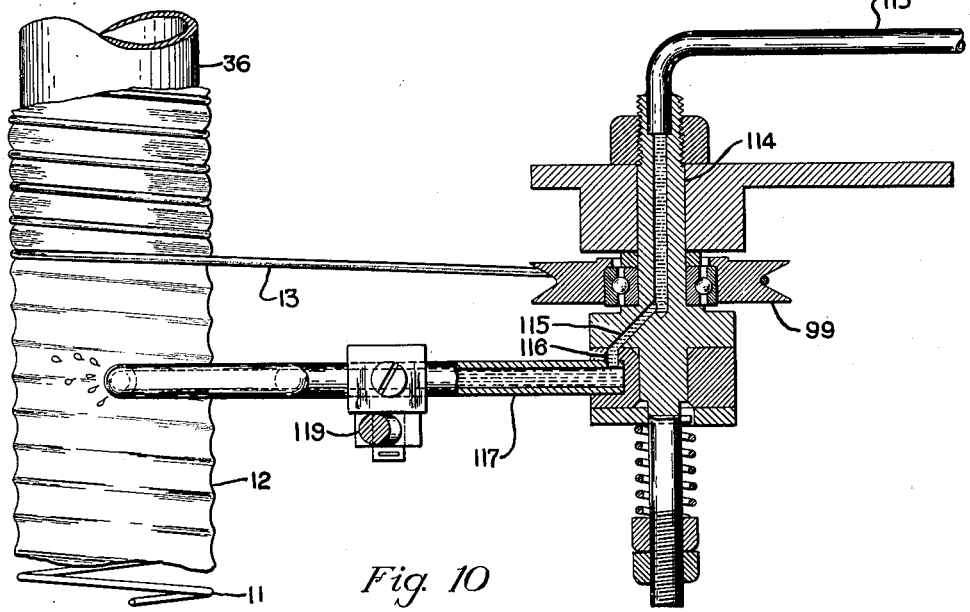
Figure 11:
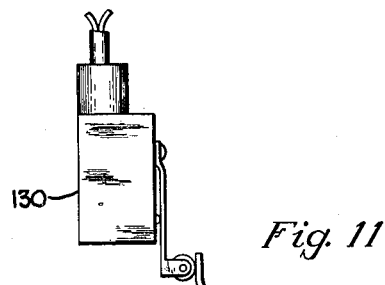
Figure 12:
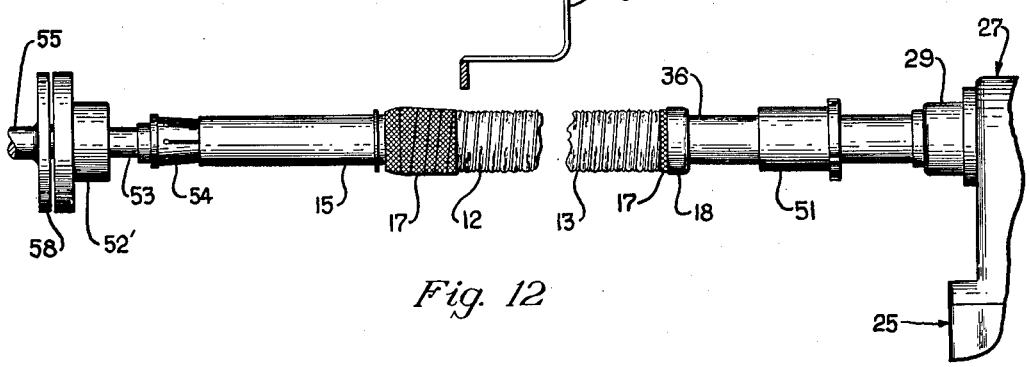

Figure 8, shown on separate sheets marked 8a and 8b, is a rear elevation of the machine showing the cord tensioning mechanism and other parts just after the start of the cord winding operation;

Figure 9 is a detail sectional view on line 9—9 of Fig. 8 looking in the direction of the arrow showing details of the cord tensioning mechanism and of the solvent dispenser;

Figure 10 is a sectional view of the solvent dispenser taken on line 10—10 of Fig. 9;

Figure 11 is a detail view of one of the control switches taken at right angles to Fig. 9 showing how the switch is operated;

Figure 12 shows the completed hose carcass on the mandrel preparatory to its removal; and Figure 13 is a view partly in section of the completed hose.

Referring to Figs. 12 and 13 the reference numeral 10 generally indicates the hose made according to the present invention. The hose wall is made up of a helically wound spring steel wire 11, an extruded seamless tube 12 of polyvinyl chloride or copolymers of vinyl chloride with vinyl acetate and an elastomeric thermoplastic cord 13 of the same material wound spirally about the tube between the convolutions of the wire and fused to the tube wall over substantially 130 to 150° of the cord circumference.

The diameter, pitch and length of the coil 11, the expansion given to it, the diameter and tensile strength of the wire, the wall thickness of the tube 12, the diameter of the cord 13, the tensile strength or hardness of the tube 12 and cord 13 and the tension applied to the cord during the winding operation depends upon the strength, durability and flexibility of the hose desired. The tensile strength or hardness of the tube 12 and cord 13 depends upon the amount of plasticizer mixed with the vinyl material in making the extruding mix. The inside diameter of the tube should be the same as that of the coil 11 and its length the same as that of the coil 11 in its expanded condition.

In making flexible hose for suction cleaners it has been found that the following conditions are satisfactory. The coil 11 may be made of spring steel wire 0.058 inch in diameter and having a tensile strength of 275,000 pounds per square inch. The inside diameter of the coil 11 and tube 12 may be 1⅜ inches. The pitch of the coil in its free state may be 0.250 inch expanded to 0.286 inch during the expanding operation and its length in expanded form approximately 113 inches. The tube 12 may be made of elastomeric thermoplastic having a tensile strength of 2,000 pounds per square inch at 85° F. and the wall thickness may be 0.026 inch. The cord 13 should be of the same strength or hardness as the tube 12. It may be slightly harder but should not be softer. A cord having a diameter of 0.076 inch and a tensile strength of 2,000 pounds per square inch at 85° F. has been found satisfactory. The tension applied to the cord during the winding operation may be between 65 and 71 ounces which will reduce the cord diameter to approximately 0.060 inch.

It is to be understood that the above figures are exemplary only and that the conditions, dimensions, etc., may be varied widely depending upon the strength, durability and flexibility of the hose desired.

The ends of the tube are attached to fittings 15 and 16 in a manner to be described in detail hereinafter. At one end the cord 13 is taped to the tube 12 by a pressure sensitive tape 17, the end of the tube wall is folded over the tape 17 at 18 and tightly wrapped by stout cord 19. At its other end the cord 13 is taped to the tube 12 by a comparatively wide band 17 of pressure sensitive tape and tightly wound by several strands of stout cord 19. Comparatively soft protecting sleeves 21 and 22 of Vinylite are then assembled over the hose ends.

The wire coil 11 is prewound and its coils are properly spaced on the machine generally indicated by the reference numeral 25 shown in Figs. 1 to 11, inclusive.

The machine generally indicated by the reference numeral 25 includes a bed plate 26, a special driving head 27 similar to the head stock on a metal turning lathe, and a special tail stock generally indicated by 28. The shaft 29 is driven by a reversible motor 30 by means of a driving belt 31 and is connected by suitable gearing to a lead screw 32.

A carriage 33 is slidably mounted on the bed plate 26 on suitable rollers 34 and is adapted to be connected to and disconnected from the lead screw 32 by a manually actuated clutch 35 in a manner similar to that of a metal turning lathe carriage.

To support the lead screw 32 between its ends, rollers 43, 44, and 45 are carried by the carriage positioned both above and below the screw 32. Additional screw support carriages 46 and 47 connected by a rod 48 carrying rollers 49 and 50 are provided. As the main carriage 33 moves back and forth auxiliary supporting carriages 46 and 47 are pushed along with it.

A winding mandrel 36 forms a continuation of the shaft 29 and both are of hollow construction from end to end to form an air conduit for a purpose to be explained hereinafter. The interior of the mandrel 36 and shaft 29 are adapted to be periodically connected to a source of air under pressure by means of a rotatable pressure joint 37, conduit 38, solenoid operated valve 39 and conduit 40 (Fig. 8b). The solenoid of the electrically operated valve 39 is suitably connected to a pair of foot actuated electric switches 41 and 42 in such manner that when either is actuated the position of the valve will be reversed.

At its head end the mandrel 36 is provided with a coil locking sleeve 51 having a tapered bore 52. At its tail end the diameter of the mandrel 36 is reduced at 53 to slidably receive a centering collet 54 for centering the hose fitting on the mandrel 36.

During operation of the reduced end 53 of the mandrel 36 is rotatably mounted in a ball bearing 51′ (Fig. 5) the outer race of which is fitted into a bore of a supporting sleeve 52′. The sleeve 52′ has an inwardly extending flange 53′ having a bore of larger diameter than the outside diameter of a hub 54′ extending forwardly from a mandrel supporting pin 55. The sleeve 52′ is secured to the supporting pin 55 by a plate 56 and bolt 57 and is spaced from the flange 58 of the pin 55 approximately 0.002 inch so that it is free to move laterally relative to the pin 55 but has little play in a longitudinal direction. Lateral movement of the sleeve 52' is resisted by a spring 59 suspended from a rod 60. The above arrangement permits lateral movement of the tail end of the mandrel 36 and prevents whipping action of its central portion during winding operations.

Figure 1A:
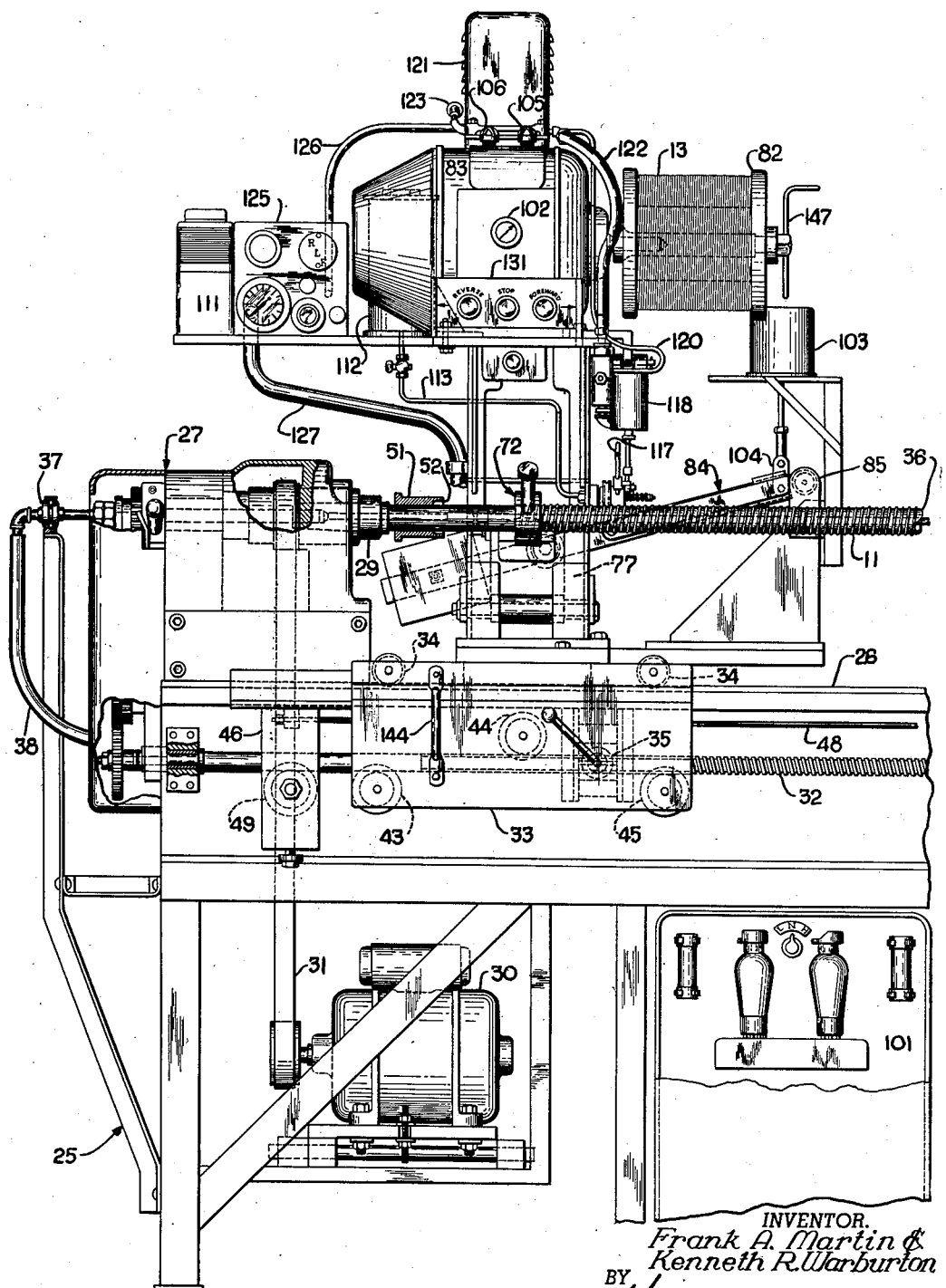
Figure 2:
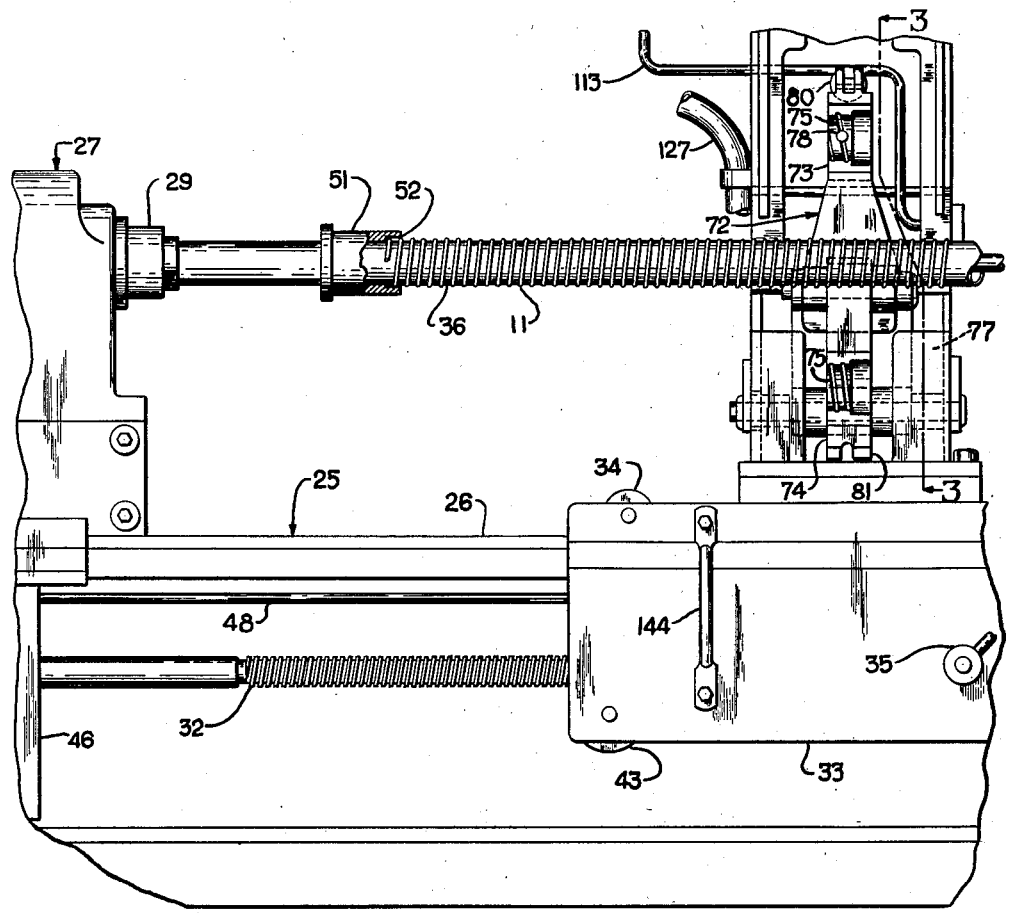
Figure 2 is a front fragmentary view showing the spacing sleeve open preparatory to applying it over the spring.
Figure 3:
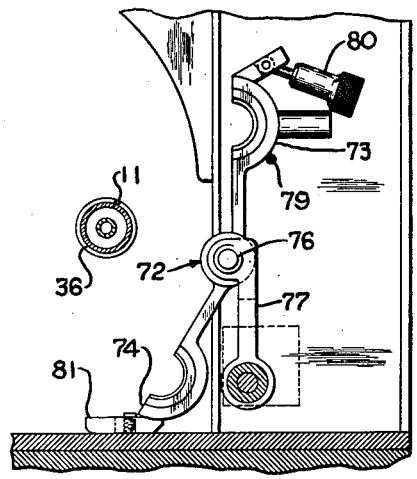
Figure 3 is a side elevation of the spacing sleeve in open position.
Figure 4:
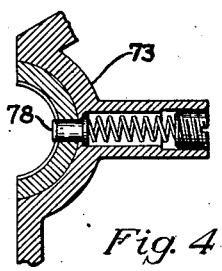
Figure 4 is a detail view showing the construction of the upper half of the spacing sleeve.
Figure 8A:
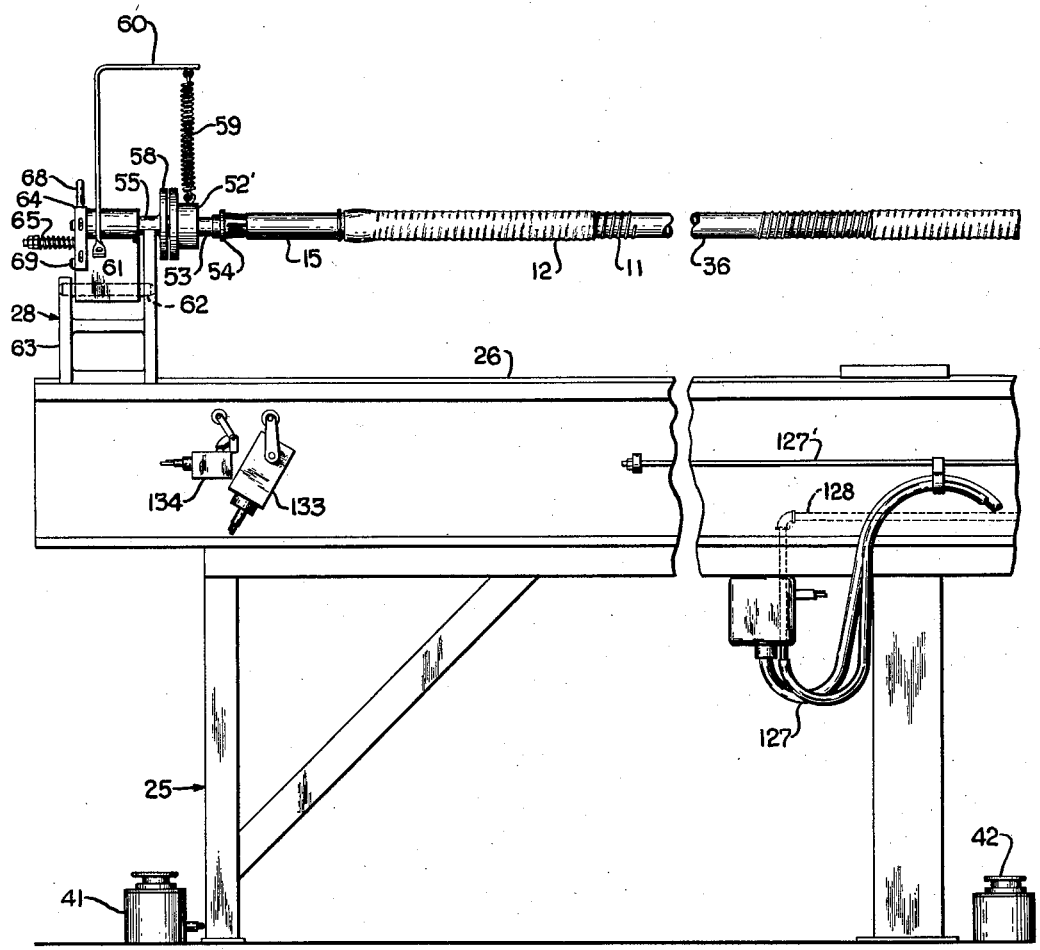

The supporting pin 55 is slidably supported for endwise movement in a bore in pivoted link 61 and the rod 60 is supported on the rear side of the link 61 as shown in Fig. 8a. Link 61 is pivoted at 62 (Figs. 1, 6 and 7) to a standard 63 mounted on the rear end of the bed plate 26. Secured to the rear end of the supporting pin 55 is a locking lever 64 spring-pressed against the rear edge of link 61 by a spring and bolt connection 65 and vertically slidable relative to both the pin 55 and the link 61 by pin and slot connections as shown in Fig. 6. The locking lever 64 is provided with a pivot pin 66 pivoting in a recess 67 in a projection of the link 61 to provide endwise movement of the supporting pin 55 by endwise movement of the handle 68.

Secured to the locking lever 64 by a pin and slot connection is a locking pin 69 which extends through a bore in the link 61 with its forward end extending into a locking recess 70' in an upward extension on the standard 63 to prevent pivotal movement of the link 61 until the locking pin is pulled endwise by the handle 68. In the open position the lock pin 69 registers with the recess 70 in the upward extension of standard 63 and locks it. A stop pin 71 is provided (Fig. 7) limiting the rearward pivoting movement of the link 61.

A spring spacer generally indicated by the reference numeral 72 (shown in detail in Figs. 3 and 4) is mounted on the carriage 33. The spring spacer 72 is in the form of two half nuts 73 and 74 having a rounded internal thread 75 (Fig. 2) of the same pitch as the final spacing of the spring coils and of the lead screw 32. The half nuts 73 and 74 have a common pivot 76 with a link 77 carried by the carriage 33. The inner linings of the half nuts are of hardened steel and the half nut 73 is provided with a spring-pressed tip 78 of tungsten carbide (known under the trade name of "Carboloy") which rides on top of the spring coils during the spring spacing operation. A stop 79 is provided to limit the pivotal movement of the half nut 73. The half nut 73 is provided with a spring pressed nut and bolt 80 which cooperate with a slot in the extension 81 of the half nut 74 to clamp the two half nuts together during the coil spacing operation.

A reel 82 for the Vinylite cord is carried by the shaft of a D. C. generator 83 which acts as a brake to vary the cord tension in a manner to be hereinafter described. The brake 83 and the reel 82 are carried by the carriage 33 and move with it to properly space the cord 13 as it is being wound. A cord tension control device in the form of a weighted arm 84 is pivoted to the carriage 33 at 85. Near its weighted end the arm 84 (Figs. 8b and 9) carries four pulleys 85', 86, 87, and 88 over which the cord strand passes as it is wound.

The cord passes from the reel 82 over the inclined pulleys 89 and 90 at the rear of the reel, forwardly over vertical pulley 91, downwardly about pulley 85', upwardly about pulley 94, downwardly about pulley 86, upwardly over pulley 93, downwardly about pulley 87, upwardly about pulley 92, downwardly about pulley 88, upwardly over vertical pulley 95, forwardly about horizontal pulley 96, rearwardly about horizontal pulley 97, about vertical pulley 98 (Fig. 9), downwardly about vertical pulley 99 and over the top of the mandrel 36. A one way cord lock 100 holds the cord threaded over the pulleys as above described.

The tension on the cord should not vary beyond the limits of 65 and 71 ounces. In order to control the cord tension the generator or brake 83 is loaded with a constant load of 100 watts and the excitation of the field controlled to vary its braking effect. Direct current is supplied to the exciting coils of the generator or brake 83, by a two tube rectifier 101 under the control of a manually actuated rheostat 102 connected in series with the A. C. circuit of the rectifier 101 by which the initial braking effect of the generator or brake 83 is regulated.

The coils of a reactance solenoid 103 are connected in series with the A. C. circuit of the rectifier 101 and its plunger is connected by a link 104 to the weighted arm 84 near its pivot point 85. As the cord is unwound from the reel 82 the torque arm tending to rotate the reel against the braking action of the brake 83 becomes less and accordingly the tension on the cord becomes greater which will cause the weighted arm 84 to rise and push the plunger into the coil 103 which will lessen the input to the rectifier 101 and accordingly the excitation of the brake 83 so as to decrease its braking effect.

A red pilot light 105 indicates when the cord tension is too high and a white pilot light 106 indicates when the cord tension is too low. Referring to Fig. 8b these lights are actuated by on-off switches 107 and 108 respectively which switches are normally in their "off" position. As the weighted arm 84 rises due to the increase in the cord tension it will contact the arm 109 and close the switch 107 to energize the red light 105 and if the arm 84 falls due to a slackening in the cord tension it will contact the arm 110 to close switch 108 and energize the white light 106. The current for the lights 105 and 106 is preferably supplied from a transformer 111. Stops 109' and 110' (Fig. 8b) are provided for the weighted arm 84 to prevent injury to the switches 107 and 108.

A solvent dispensing means is also carried by the carriage 33 to supply solvent to the wall of the tube at a point a few turns ahead of the point where the cord is being wound in order to soften the material of the tube so that the cord will adhere thereto as it is wound about the tube. For that purpose a receptacle 112 is provided for the bonding liquid which may be 50% toluene and 50% methyl ethyl ketone by volume.

A valved conduit 113 extends downwardly to a hollow shaft 114 (Figs. 9 and 10) which supports the pulley 99. The hollow shaft has an orifice 115 which registers with an orifice 116 in the side wall of a pivoted dispensing tube 117 when it is in the position shown in Fig. 9. As shown in Fig. 10 the tube joint is spring pressed against a shoulder on the shaft 114 in order to make a fluid tight joint.

In order to coordinate the delivery of solvent simultaneously with the starting of the winding operation the dispensing tube is moved to dispensing position simultaneously with the beginning of the winding operation. For that purpose an air cylinder 118 (Figs. 1 and 9) is provided.

The connecting rod 119 of the air cylinder is pivoted to the dispensing tube 117 intermediate its ends. The upper end of the cylinder 118 is connected by a conduit 120 to a solenoid actuated reverse flow air valve 121 and its lower end is connected thereto by a conduit 122. An exhaust pipe 123 is also connected to the valve 121. When the valve is in one position air pressure is maintained in the conduit 120 and the conduit 122 is open to the exhaust. When the valve 121 is in the reverse position pressure is maintained in the conduit 122 and conduit 120 is open to the exhaust.

The conduit 122 includes a damper device 124 to damp the downward movement of the dispensing tube 117 to its dispensing position. A check valve within the damper 124 permits air to flow therethrough freely from conduit 122 and a restricted opening therein provides for a slow movement of air therethrough when air is being exhausted from the bottom of cylinder 118.

The valve 121 is connected to a pressure regulator, filter and oiler 125 by a conduit 126. The pressure regulator 125 is connected to the source of air under pressure by a flexible hose 127 and conduits 128 and 40. The hose 127 is supported on the back of the bed plate 26 by a rod 127' so as to have freedom of movement as the carriage 33 is moved back and forth.

Attached to the side of the cylinder 118 (Figs. 9 and 11) in a position to be actuated by an extension 129 on the connecting rod 119 is an on-off switch 130 which is normally in its open position and which energizes the driving motor 30 as the tube 117 moves to its dispensing position.

On the front of the carriage 33 is mounted a main control panel 131 having a forward button, a stop button and a reverse button for controlling the energization of the motor 30 and the solenoid of the valve 121. On the back of the bed plate 26 are three on-off switches 132, 133 and 134 normally in their "on" position and adapted to be moved to their "off" position by contact with adjustable operating bars 135 and 136 carried by the carriage 33 as shown in Fig. 8b.

A master switch (not shown) closes the circuit to the rectifier 101 when in closed position. The switch 132 is in series with the reverse switch and the motor 30 so that the carriage 33 will be automatically stopped as it reaches the forward end of its travel during the spring spacing operation. The forward switch is in series with the coils of the valve 121 and with the normally closed switch 134. The forward switch is also in series with the normally open switch 130, the windings of the motor 30 and the normally closed switch 133. In addition to the rheostat 102 and the coils of the solenoid 103 the A. C. circuit of the rectifier 101 includes a time delay switch to permit the tubes to warm up and suitable anti-hunting and protective circuits well known in the electronic art.

At the beginning of a cord winding operation the forward switch is manually closed and since switch 134 is then closed the valve 121 will be actuated to lower the solvent tube 117 to dispensing position. Lowering of the solvent tube will then close the normal open switch 130 and energize the motor 30. The rectifier 101 is always energized when the master switch is closed and accordingly the braking action of the generator or brake 83 is always applied to the reel 82 during operation.

When the carriage 33 reaches the tail end of the machine the actuator 136 will open the normally closed switch 133 and deenergize the motor 30. Due to the inertia of the parts the motor 30 will over-run so as to wind a few more turns on the mandrel, it being noted that the braking effect of the brake 83 is always active so that tension will still be applied to the cord. Eventually the actuator 136 will open the normally closed switch 134 to reverse the valve 121 and the dispensing tube 117 is raised upwardly to close off the flow of solvent.

Referring to Figs. 6 and 7 a hand tool 137 is shown in the form of pivoted members the handle and jaw ends of which are on the same side of the pivot so that a gripping action on the handle spreads the jaws. The jaws are provided with offset spreading members 138 adapted to be inserted in the end of the tube 12 and the handle end is provided with a pivoted loop 139 to lock the jaws in spread position with the tube end spread sufficiently to be slipped over the coil spring 11 on the mandrel 36. A hook 140 is also provided on the tool 137 to hook over the flange of the wire gripping sleeve 51.

During the extrusion of the tube 12 it is wound upon reel 141. The reel 141 is mounted for rotation on a stand 142 immediately to the rear of a tube holding stand 142' between the reel 141 and the rear of the machine 25. The tube holding stand 142' is provided with a clamp 143 to hold the tube walls together and form an air seal as shown in Fig. 6.

*Operation*

The handle 68 is moved endwise in an arc, pivoting at 66 as shown in Figs. 6 and 7, releasing latch pin 69 from recess 70' and simultaneously pulling the supporting sleeve off the reduced end 53 of mandrel 36 to free the rear end of the mandrel. The tail stock assembly 28 is then moved in an arc at right angle to the machine about pivot 62 to the position shown in Figs. 6 and 7, latch pin 69 registering with recess 70 to hold tail-stock in open position. Stop pin 71 is provided to limit rearward movement of tail-stock assembly.

A precoiled spring of proper length is then slid over the length of the mandrel.

At the free tail end of the mandrel, fitting 15 is slipped over the mandrel and under the end of the spring 11, so that its inner end rests against the shoulder 23 as shown in Fig. 5. The end coil of the spring is adjacent to the second head 15' on the fitting 15. The supporting sleeve 52' is then replaced on the reduced end 53 of the mandrel 36. The rear end of the coiled spring is then taped to the fitting 15 by a pressure sensitive tape 145 as shown in Fig. 5.

Carriage 33 is then moved manually by the handle 144 toward the tail end of the bed 26 until the spacer 72 is positioned over the end of the fitting 15 adjacent the tape 145 and clamped about the spring and mandrel 36 by positioning the bolt 80 in the slot in the projection 81 whereby the spring pressed nut will move downwardly while the spring 11 is positioned in the threads 75 of the half nuts 73 and 74. The pitch of the spring as originally coiled is approximately 0.250 inch and the pitch of the thread 75 is approximately 0.286 inch and it will therefore be necessary to stretch the spring slightly in applying the spacer 73 so as to position the coils in the threads 75.

The carriage 33 is then engaged with the screw 32 (which has the same pitch as the threads 75 of the spacer 73) by actuation of the clutch 35. The reverse button on the control panel 131 is then actuated causing the motor 30 to rotate the mandrel 36 clockwise as viewed from the tail end of the machine.

During this operation the thread 75 of the spacer 73 will move the coils of the spring axially and the "carboloy" insert riding on the top of the coil 11 will stretch the coil slightly circumferentially so that the spirals tightly grip the mandrel 36 whereby they will be rigidly held against movement during the subsequent operations of applying the tube and winding the cord.

As the carriage 33 approaches the head end of the machine the actuator 135 will open the switch 132 and stop the motor 30 when the spacer 72 has reached the point a few turns from the end of the coil 11. The spacer 72 is removed from the end of the coil, taking care to hold the spring from unwinding and clamping collar 51 moved rearwardly to bring its tapered bore 52 over the end coils of the wire to clamp them tightly to the mandrel 36 so that the coil will not unwind. The stop button on the main control panel 131 is then operated and the carriage 33 disengaged from the lead screw 32.

During the above operation the coil is lengthened considerably and given approximately 1% more turns than it originally had.

The tail stock is again removed to the position shown in Fig. 7 as previously described and a length of hose sufficient to cover the entire length of the extended spring is unwound from the reel 141, placed on the supporting stand 142' and the clamp 143 applied as shown in Fig. 6. The jaw extensions 138 of the tool 137 are inserted in the tube end, operated to expand the tube end and locked by the link 139.

The normal inside diameter of the tube 12 is substantially 1⅜ inches which is the diameter of the mandrel 36. The open end of the tube 12 is then applied over the free end of the mandrel 36 and the foot switch 41 actuated to open solenoid valve 39 (Fig. 8b) whereby air under pressure will be supplied through the interior of the mandrel 36 to inflate the tube 12. The tube is then drawn over the wire coiled on the mandrel 36 until its open end extends slightly over the clamp ring 51, the hook 140 of the spreader tool is hooked over the flange of the sleeve 51 and the foot switch 42 operated to close valve 39 and shut off the air pressure.

The tube 12 will then deflate through its open end after which the spreader tool 137 is removed, the tube 12 cut at the tail end of the spring and the excess tubing removed from the mandrel 36. The supporting ring 52' is again applied to the reduced end 53 of the mandrel 36 and the machine is ready for the cord winding operation.

The first operation when starting with a fresh coil of cord is to thread the cord onto the cord tensioning mechanism. The cord 13 is threaded over the pulleys of the cord tension control as previously described so that its free end is positioned between the pulleys 98 and 99 and locked in that position by cord lock 100. The weighted arm 84 is then resting against the lower stop 110'.

The carriage 33 is then positioned by hand so that the lower guide pulley 99 is opposite the front end of the tube which covers the spring. The free end of the cord is then threaded about the pulley 99 and over the top of the mandrel 36 as shown in Fig. 9, two or three turns of cord are wound over the tube midway between the wire convolutions, the pressure sensitive tape 17 applied and the carriage 33 reengaged with the lead screw 32. A manual switch may be provided to momentarily actuate the solenoid switch 121 to lower the dispensing tube 117 to dispense solvent on the few turns of the cord wound by hand.

The reel 82 is then turned backward by means of the handle 147 to take up the slack in the cord and to raise the weighted arm 84 from the stop 110' to a position above the switch arm 110. The forward button on the control panel 131 is then actuated which will energize the solenoid valve 121 to supply air to the top of the cylinder 118 (Fig. 9) and move the solvent dispensing tube to its dispensing position under the restricting action of the damper 124. As the piston rod 119 moves downwardly the actuator 129 will close the switch 130 and start the motor 30 at which time the handle 147 of the reel 82 is released and the dancing arm 84 will take over the control of the cord tension.

The mandrel 36 will then be rotated counterclockwise as viewed from the tail end of the machine and the carriage 33 will move to the right. The cord 13 will be wound over the tube 12 midway between the wire convolutions and under a constant tension maintained by the tension control device as previously described. The mandrel 36 rotates approximately 1200 R. P. M. and the lateral movement of the tail end of the mandrel permitted by the tail stock will prevent the center of the mandrel from whipping and thus assure that the cord tension is constant over the entire circumference of the tube.

As the carriage 33 approaches the tail end of the bed 26 the actuator 136 will first open the switch 133 to deenergize the motor 30. Due to the inertia of the parts the motor 30 will continue to rotate and wind a few more turns still under constant tension until the actuator opens the switch 134. When that occurs the solenoid valve 121 will be energized to reverse the air pressure in cylinder 118 and raise the dispensing tube 117 to shut off the flow of solvent. While the weighted arm 84 will contact switch arm 110 that will have no effect because the switch 134 is open. The stop button on the control panel 131 is then actuated to deenergize the entire machine except the rectifier 101.

The cord 13 is then cut between the pulleys 98 and 99 and the pressure sensitive tape 17 applied. The end 18 of the tube 12 (Fig. 12) is turned backwardly over the tape 17 and the sleeve 51 moved toward the head to release the head end of the hose carcass and the collar 54 is released to release the tail end of the carcass. The tail stock 28 is then removed to the position shown in Fig. 7 and the hose carcass removed from the mandrel 36 by twisting it in a direction to expand the coil spring to release its grip on the mandrel.

When the hose carcass is removed it will collapse endwise from approximately 113 inches to approximately 95 inches due to the tension applied to the cord during the winding process and to the axial expansion of the coil spring 11. It is to be noted that during the winding operation the cord 13 is stretched and when the hose is removed from the mandrel it tends to assume its original length and thus draws the cord 12 inwardly between the wire convolutions. Both of the foregoing features contribute to the formation of very flexible hose especially useful with suction cleaning apparatus.

The hose carcass is then cured according to the process disclosed and claimed in an application for Letters Patent by Frank A Martin and Kenneth R. Warburton, Serial No. 162,883 filed May 19, 1950.

After the curing operation the fitting 16 is inserted into the end of the hose opposite the fitting 16 by a twisting action until the ribs are all engaged behind the spring coils. The cord 19 is then wound about the tube ends on a winding machine and the protecting sleeves 21 and 22 applied in any suitable manner.

While we have shown but a single embodiment of our invention it is to be understood that this embodiment is to be taken as illustrative only and not in a limiting sense. We do not wish to be limited to the particular structure and method shown and described but to include all equivalent variations thereof except as limited by the scope of the claims.

We claim:

1. A hose making machine for assembling a seamless elastomeric thermoplastic tube over an expanded coiled reenforcing wire and winding an elastomeric thermoplastic cord under constant tension over the tube midway between the expanded convolutions of the coiled wire comprising, a bed plate, a carriage movably mounted on said bed plate, a lead screw for moving said carriage along said bed plate, said lead screw having the same pitch as that of the expanded coils of the reenforcing wire, a mandrel of substantially the same diameter as the inside diameter of the coil rotatably mounted on said bed plate, a reversible motor drivingly connected to said mandrel and lead screw so as to rotate them in unison, internally threaded coil spacing means carried by said carriage the threads of said spacing means having a greater pitch than that of the free coils of the wire and of a diameter to tightly grip the wire coils whereby the coils of the spring are stressed axially and circumferentially to cause the coils to grip said mandrel as said mandrel is rotated in one direction and said carriage moves from one end of said bed plate to the other, a cord reel and cord tensioning device carried by said carriage, and means for controlling the tension applied to the cord by said tensioning device so that the cord is wound about the tube under constant tension as the mandrel is rotated reversely, and said carriage returns to the starting end of said bed plate.

2. A hose making machine according to claim 1 including a solvent dispenser carried by said carriage positioned to dispense solvent on the tube a few turns ahead of the point where the cord is being wound about the tube.

3. A hose making machine according to claim 2 in which said solvent dispenser includes a pivotally mounted dispensing tube having a valve associated therewith which is moved to open position as said tube is moved to its dispensing position.

4. A hose making machine according to claim 3 including control means operable to reverse said motor to cause said mandrel to rotate reversely and said carriage to move to the starting end of said bed plate and means automatically operable to move said dispensing tube to its dispensing position when said control means is operated.

5. A hose making machine according to claim 1 in which said mandrel is of hollow construction and connected to a source of air under pressure whereby the tube can be inflated and drawn over the expanded coil spring between the spring spacing and cord winding operations.

6. A hose making machine according to claim 5 including a valve for controlling the flow of air to the interior of said mandrel and means at each end of said bed plate for actuating said valve.

7. A hose making machine according to claim 1 in which said cord tensioning device includes an electric brake and means for varying the excitation of said brake to vary its braking effect with variations in cord tension.

8. A hose making machine according to claim 7 including manually actuatable means for varying the excitation of said brake to adjust the tension initially applied to the cord.

9. A hose making machine according to claim 7 in which said last mentioned means includes a pivoted weighted arm having a pulley over which the cord passes as it is wound over the tube and means actuated by movement of said arm in either direction to vary the excitation of said brake.

10. A hose making machine according to claim 1 in which said coil spacing means includes a split sleeve having a spiral interior groove of the same pitch as that of said lead screw and of a size and shape to fit closely about the wire of the coils as the coils are expanded so as to stress the wire both axially and circumferentially.

11. A hose making machine according to claim 10 including a spring pressed insert of tungsten carbide in the wall of said sleeve positioned to ride over the top of the wire coils as they are expanded.

12. A hose making apparatus for assembling a seamless elastomeric thermoplastic tube over an expanded coiled reenforcing spring and winding an elastomeric thermoplastic cord under constant tension over the tube midway between the expanded convolutions of the coiled spring comprising, a bed plate, a carriage slidably mounted on said bed plate, a lead screw for moving said carrier along said bed plate, said lead screw having a pitch the same as that of the expanded coils of the spring, a rotatable spindle at the head end of said bed plate, a mandrel of substantially the same diameter as the inside diameter of the coils of the spring carried by said spindle, a tail stock at the tail end of said bed plate for rotatably supporting the tail end of said mandrel, said tail stock being pivotally mounted so as to be movable out of the axis of said mandrel, a reversible motor drivingly connected to said spindle and lead screw to rotate them in unison, a cord reel and cord tensioning device carried by said carriage, said cord tensioning device including an electric brake in the form of a D. C. generator under constant load and excited by the D. C. circuit of an electronic rectifier, a weighted arm having a pulley over which the cord passes as it is wound about said mandrel, a reactance solenoid the coils of which are in series with the A. C. circuit of said rectifier and a plunger carried by said weighted arm and positioned to be moved into and out of said solenoid as said arm moves with variations in cord tension.

13. A hose making apparatus according to claim 12 including a manually actuatable rheostat in series with the A. C. circuit of said rectifier to manually adjust the initial braking effect of said brake.

14. A hose making apparatus for assembling a seamless elastomeric thermoplastic tube over an expanded coiled reenforcing spring and winding an elastomeric thermoplastic cord under constant tension over the tube midway between the expanded convolutions of the coiled spring comprising, a bed plate, a carriage slidably mounted on said bed plate, a lead screw for moving said carriage along said bed plate, said lead screw having a pitch the same as that of the expanded coils of the spring, a rotatable spindle at the head end of said bed plate, a mandrel of substantially the same diameter as the inside diameter of the coils of the spring carried by said spindle, a tail stock at the tail end of said bed plate for rotatably supporting the tail end of said mandrel, said tail stock being pivotally mounted so as to be movable out of the axis of said mandrel, a reversible motor drivingly connected to said spindle and lead screw to rotate them in unison, a solvent dispenser carried by said carriage, said solvent dispenser including a pivoted tube having a valve associated therewith which is opened by movement of said tube to its dispensing position, an air motor for moving said dispensing tube to its dispensing position, an electromagnetic valve for controlling air flow to and from said air motor, manually actuatable switch means for energizing said valve to supply air to said air motor to move said dispensing tube to its dispensing position, switch means actuated by movement of said dispensing tube to its dispensing position for energizing said reversible motor to cause said mandrel to rotate reversely and said carriage to move from the head end to the tail end of said bed plate, first switch means at the tail end of said bed plate operable by movement of said carriage as it approaches the tail end of said bed plate to deenergize said reversible motor and second switch means at the tail end of said bed plate and operable by movement of said carriage past said first switch means for deenergizing said electromagnetic valve to cause said air motor to move said dispensing tube to its non-dispensing position.

15. A hose making apparatus for assembling a seamless elastomeric thermoplastic tube over an expanded coiled reenforcing spring and winding an elastomeric thermoplastic cord under constant tension over the tube midway between the expanded convolutions of the coiled spring comprising, a bed plate, a carriage slidably mounted on said bed plate, a lead screw for moving said carriage along said bed plate, said lead screw having a pitch the same as that of the expanded coils of the spring, a rotatable spindle at the head end of said bed plate, a mandrel of substantially the same diameter as the inside diameter of the coils of the spring carried by said spindle, a tail stock at the tail end of said bed plate for rotatably supporting the tail end of said mandrel, said tail stock being pivotally mounted so as to be movable out of the axis of said mandrel, a reversible motor drivingly connected to said spindle and lead screw to rotate them in unison, a split sleeve having internal spiral grooves of the same pitch as that of the expanded coils of the spring and of a shape and size to closely fit about the wire of said coils carried by said carriage, a clamping collar at the tail end of said mandrel to clamp the tail end of the coil to said mandrel and a clamping sleeve on the head end of said mandrel to clamp the head end of the coil to said mandrel.

16. Hose making apparatus for assembling a seamless elastomeric thermoplastic tube over an expanded coiled reenforcing spring and winding an elastomeric thermoplastic cord under constant tension over the tube midway between the expanded convolutions of the coiled spring comprising, a bed plate, a carriage slidably mounted on said bed plate, a lead screw for moving said carriage along said bed plate, said lead screw having a pitch the same as that of the expanded coils of the spring, a rotatable spindle at the head end of said bed plate, a mandrel of substantially the same diameter as the inside diameter of the coils of the spring carried by said spindle, a tail stock at the tail end of said bed plate for rotatably supporting the tail end of said mandrel, said tail stock being pivotally mounted so as to be movable out of the axis of said mandrel, a reversible motor drivingly connected to said spindle and lead screw to rotate them in unison, a spring spreading device carried by said carriage, a cord reel and cord tensioning device carried by said carriage, said mandrel and spindle being of hollow construction and connected to a source of air under pressure, means for closing off the rear end of a length of tubing to be assembled over the spring, means for expanding the open end of the tube to a diameter whereby it can be pulled over said spring and control means for supplying air to the interior of said mandrel to inflate the tube as it is drawn over the expanded spring.

17. A hose making apparatus for assembling a seamless elastomeric thermoplastic tube over an expanded coiled reenforcing spring and winding an elastomeric thermoplastic cord under constant tension over the tube midway between the expanded convolutions of the coiled spring comprising, a bed plate, a carriage slidably mounted on said bed plate, a lead screw for moving said carriage along said bed plate, said lead screw having a pitch the same as that of the expanded coils of the spring, a rotatable spindle at the head end of said bed plate, a mandrel of substantially the same diameter as the inside diameter of the coils of the spring carried by said spindle, a tail stock at the tail end of said bed plate for rotatably supporting the tail end of said mandrel, said tail stock being pivotally mounted so as to be movable out of the axis of said mandrel, a reversible motor drivingly connected to said spindle and lead screws to rotate them in unison, a spring spreading device carried by said carriage, a cord reel and cord tensioning device carried by said carriage, said mandrel and spindle being of hollow construction and connected to a source of air under pressure, said tail stock being constructed to permit lateral shifting of the tail end of said mandrel to prevent whipping of the central portion thereof during the cord winding operation.

18. Hose making apparatus according to claim 17 including spring means for resisting lateral shifting of the tail end of said mandrel during the spring spreading and cord winding operation.

FRANK A. MARTIN.
KENNETH R. WARBURTON.

References Cited in the file of this patent

UNITED STATES PATENTS

| Number | Name | Date |
| --- | --- | --- |
| 1,516,620 | Rankin | Nov. 25, 1924 |
| 2,093,206 | Muller | Sept. 14, 1937 |
| 2,426,631 | Mapes | Sept. 2, 1947 |
| 2,485,895 | Larsen et al. | Oct. 25, 1949 |
| 2,486,763 | Roberts | Nov. 1, 1949 |
| 2,509,250 | Roberts | May 30, 1950 |
| 2,550,099 | Vance | Apr. 25, 1951 |